United States Patent [19]
Reele et al.

[11] Patent Number: 5,619,257
[45] Date of Patent: Apr. 8, 1997

[54] COMBINED FILM AND ELECTRONIC CAMERA WITH STORAGE DENSITY SELECTION, SEGMENT IMAGE STACKING, INSTANT VIEW AND HIGH RESOLUTION FILM MODE

[75] Inventors: Samuel Reele, Rochester; Alan L. Korus, Fairport, both of N.Y.

[73] Assignee: Eastman Kodak Company, Rochester, N.Y.

[21] Appl. No.: 355,381

[22] Filed: Dec. 13, 1994

[51] Int. Cl.$^6$ ................................ H04N 7/18; H04N 5/30
[52] U.S. Cl. ................................ 348/64; 348/344; 396/429
[58] Field of Search ................................ 348/207, 64, 233, 348/231, 344, 232, 384, 49; 354/76; 352/131; H04N 7/18, 5/30

[56] References Cited

U.S. PATENT DOCUMENTS

| | | | |
|---|---|---|---|
| 4,237,492 | 12/1980 | Roth et al. | 348/344 |
| 4,456,931 | 6/1984 | Toyoda et al. | 358/335 |
| 4,689,696 | 8/1987 | Plummer | 358/333 |
| 4,714,962 | 12/1987 | Levine | 358/209 |
| 4,716,470 | 12/1987 | Levine | 358/256 |
| 4,742,369 | 5/1988 | Ishii et al. | 354/441 |
| 4,814,814 | 3/1989 | Leiter | 354/432 |
| 4,827,347 | 5/1989 | Bell | 358/224 |
| 4,841,359 | 6/1989 | Hawkins et al. | 358/76 |
| 4,868,642 | 9/1989 | Kaneko | 358/76 |
| 4,887,161 | 12/1989 | Watanabe et al. | 358/224 |
| 4,937,676 | 6/1990 | Finelli et al. | 358/229 |
| 4,943,867 | 7/1990 | Suetaka et al. | 358/342 |
| 5,016,107 | 5/1991 | Sasson et al. | 348/231 |
| 5,018,017 | 5/1991 | Sasaki et al. | 348/232 |
| 5,023,635 | 6/1991 | Nealon | 354/76 |
| 5,027,214 | 6/1991 | Fujimori | 348/233 |
| 5,150,215 | 9/1992 | Shi | 348/64 |
| 5,164,751 | 11/1992 | Weyer | 354/76 |
| 5,245,328 | 9/1993 | Garrett | 345/149 |

*Primary Examiner*—Andrew Faile
*Assistant Examiner*—Andrew B. Christensen
*Attorney, Agent, or Firm*—David M. Woods

[57] ABSTRACT

A camera that includes negative film and a CCD sensor for simultaneously capturing images chemically and electronically using a beam splitter. A liquid crystal display is used for viewing the captured images immediately after they are captured or for reviewing images stored in a removable memory for deletion or output. An adjustable lens and mirror which can route light from the source directly to the film when a high quality image is to be captured, so that the source light is not split between the film negative and the sensor. The images can be stored at various densities, such as 3×5 print or fax resolution, to match the intended output. The memory is organized into stack locations. Each stack location can store one or more images of varying densities allowing the camera to effectively use the memory. The storage status of each stack location is indicated by stack location partition flags. A full memory can also be removed and replaced. The stored images can also be transferred to other forms of media.

4 Claims, 6 Drawing Sheets

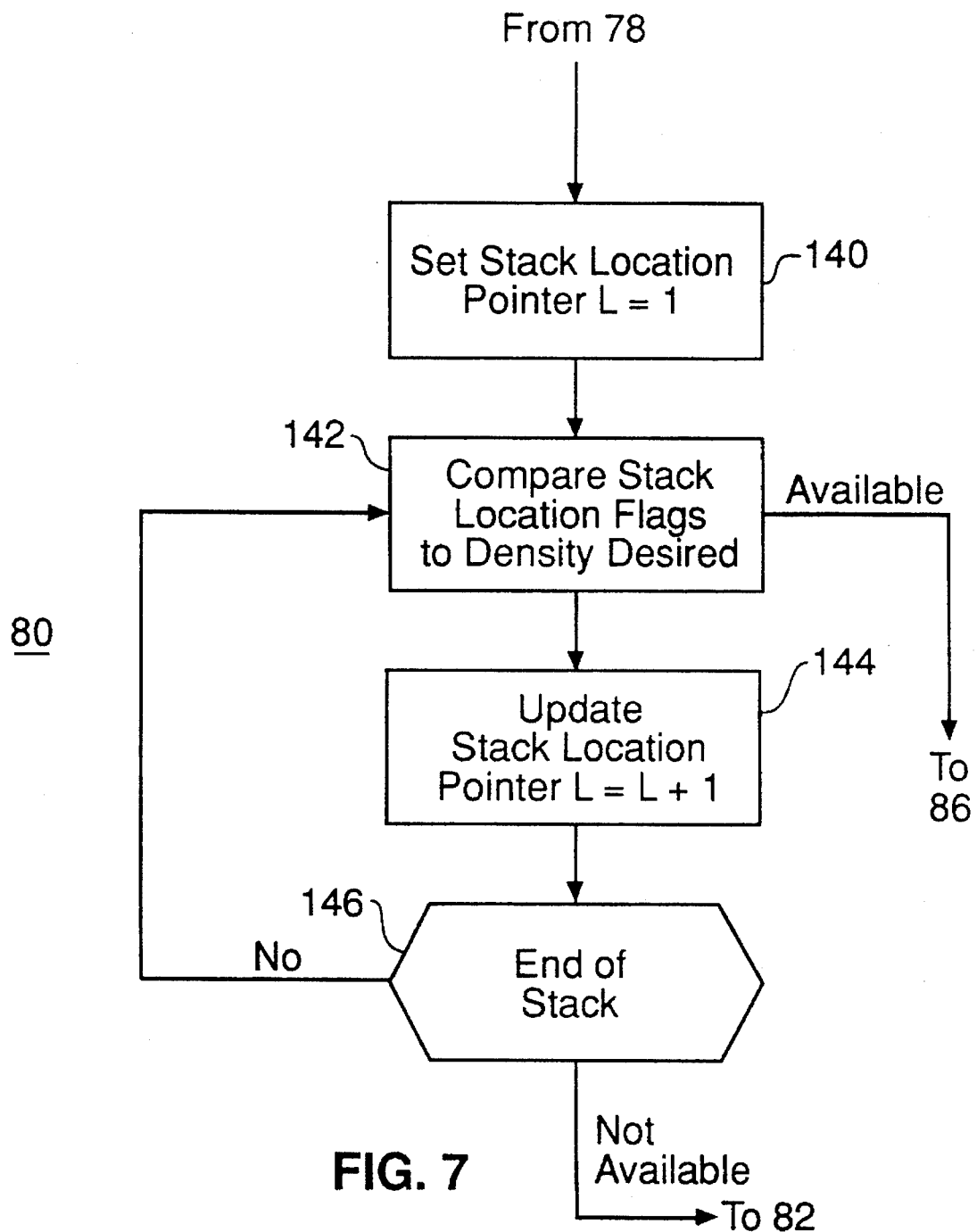

COMBINED FILM AND ELECTRONIC CAMERA WITH STORAGE DENSITY SELECTION, SEGMENT IMAGE STACKING, INSTANT VIEW AND HIGH RESOLUTION FILM MODE

BACKGROUND OF THE INVENTION

1. Field of the Invention

The present invention is directed to an electronic and film camera which combines the features of traditional, instant and electronic image capture. More particularly, the invention relates to a camera in which images are stored on negative film and in an electronic memory where the density or resolution of the images stored electronically can be selected, the images are stored in a segmented stack memory allowing variable density images to be interleaved, the stored images can be immediately viewed on a liquid crystal display, and which has a high resolution mode in which all the light from the source falls on the negative film.

2. Description of the Related Art

Today there are four predominant forms of image capture and storage: 1) traditional silver-halide image capture on a negative, 2) instant photography directly onto a photographic print, 3) electronic image capture onto a CCD array, and 4) photo CD on a polycarbonate disc.

Each form has its own distinct advantages and disadvantages. For instance, traditional image capture on silver-halide negatives offers the highest quality and highest degree of pixel resolution but the negatives take time to develop and process, and storage and viewing are cumbersome. Instant photography, on the other hand, offers the convenience of real-time viewing, but with poor image quality, poor resolution and cumbersome means of storage. Electronic image capture does not have the image resolution of silver-halide negatives and is more costly at present, but offers improved means of storing images and an efficient means of transferring image data to other means of display. Photo CD presently tries to capture the benefits of silver-halide image capture, electronic manipulation of image data, and image transfer as well as a superior means of storage and viewing through the CD player or thermal prints. The predominant shortcomings of the Photo CD System are the length of time it takes to preview an image, the cost of a dual media of storage (one must print images on paper prior to preview—negative and printing costs alone equal the cost of a CD and the transferal process), and the rather cumbersome customer interface.

Polaroid, Sony, and Kodak have all developed products in these areas. Polaroid Achieva's mechanical storage (a physical stack of prints) enables consumers to view instant photographs at their convenience instead of immediately after the pictures are taken. The Sony Camcorder has a liquid crystal display (LCD), not a viewfinder display of a CCD image. Kodak produces an electronic camera with an LCD and a tether line to thermal printer.

What is needed is a camera that provides the high resolution and contrast of conventional film cameras with the convenience of electronic cameras while allowing varying storage densities which match the desired output and which uses camera memory effectively as well as the instant review (or preview with respect to CD type transfer) capability of the instant cameras.

SUMMARY OF THE INVENTION

It is an object of the present invention to provide a camera in which an image splitter (for allowing simultaneous film and electronic image capture) can be obviated to allow all the source light to fall solely on the film negative to maximize film image quality.

It is another object of the present invention to allow captured images to be viewed immediately or previewed when the intent is to transfer images to CD.

It is another object of the present invention to provide a camera that includes stack segmented memory for storing images of varying densities and thus maximize memory utilization while enhancing access speed.

It is another object of the present invention to provide a simple mechanism to allow a user to quickly move through and select stored images without specifying particular memory locations for viewing.

It is another object of the present invention to allow the user to designate the image density or resolution of the stored image and thereby define the image quality and only store the quality of image desired.

It is another object of the present invention to provide a camera with a removable electronic storage media.

The above objects can be attained by a camera that includes both negative film and a CCD sensor (for simultaneously capturing images chemically and electronically) as well as a liquid crystal display for viewing the captured images immediately after they are captured. The camera includes a lens and mirror system that routes light from the source directly to the film (i.e. the light is not split between the film negative and the CCD) when a high quality image is to be captured. The electronically captured images can be stored at various densities, such as 8×10 print or fax resolution, to match the intended output. The memory is organized into segments in which images are stacked. Each stack can store several images of varying densities allowing the camera to effectively use the memory. A full memory can also be physically removed and an empty memory substituted allowing the electronically stored images to be processed while additional images are captured. The stored images can be transferred to other forms of media.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 5–7 depict the details of some of the steps of FIG. 4.

DESCRIPTION OF THE PREFERRED EMBODIMENTS

Figure 1:
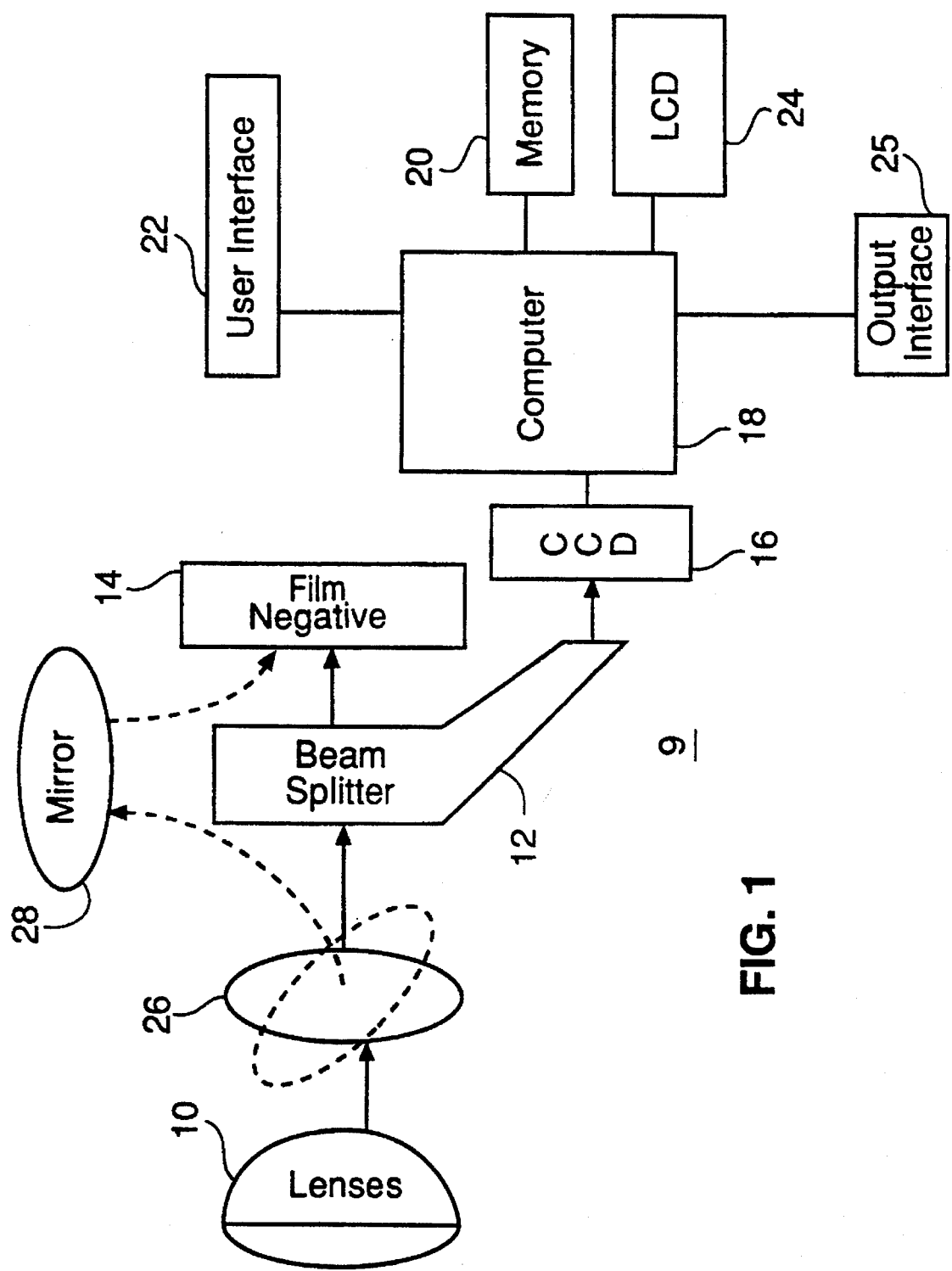
FIG. 1 depicts the components of the present invention.

The present invention combines traditional silver-halide image capture with solid-state memory image capture capability. The system 9, illustrated in FIG. 1, includes the conventional lenses 10 found in a camera and which conventionally focuses the source image on a single photographic capture plane. In the present invention, however, two physical image capture planes are provided: a photographic image plane and a CCD image capture plane. A beam splitter 12, splits the source image and projects the image onto conventional negative film 14 and onto a charge coupled detector (CCD) 16. The CCD 16 provides the image to a computer 18 which stores the image in a memory 20 (either non-volatile, fixed, or a non-volatile, removable-memory card, such as a flash memory PCMI compatible card). A user interface 22 allows user-defined input that determines image storage quality and image density. A liquid crystal display (LCD) 24 is provided to view the stored images. The LCD 24 allows the user to substantially instantly decide on whether the image needs to be retaken, or allows the user to preview the stored images and decide which images they would like to directly transfer to a different storage media, such as Photo CD, or, after viewing the image on the LCD (which has also been captured on the negative film 14) to decide whether the negative should be developed. The transfer from memory 20 is accomplished through a conventional interface 25. The system also allows the user to preview snapshots prior to actually developing and printing any negatives as well as prior to exposing a negative. The "electronic preview" requires the storage of a number of images in the memory 20 which are preferably stored in a stack. When a defined stack limit is reached, the system can capture new images and over-write a stored picture. This invention combines the benefits of instant photography, traditional silver-halide image capture, electronic image capture, and Photo CD into one homogenous system with transparent interfaces.

The quality of the captured negative image can be improved by providing an image routing lens 26 that can be positionally adjusted to bounce the source image off of a mirror 28 and directly onto the film negative 14. The position adjustment can be via a hand operated lever or via a motor drive. The adjustment routes 100% of the source light around the beam splitter 12 and increases the amount of light that falls on the negative 14. This improves the quality of the captured image in low light or low contrast situations. It also allows the user to take the equivalent quality pictures at one-half light that a state of the art (prior art) CCD/traditional camera system could take, due to the fact that no light is diverted from the photographic image plane. As an alternative, the beam splitter 12 can be made to pivot out of the light path, so that the light falls directly onto the negative 14 much like pivoting mirrors in conventional through-the-lens cameras. This would require that the lens 10 refocus the image since the length of the path has been reduced due to the removal of the refractive effects of the splitter.

As noted above, the present invention uses a single sensor 16 to capture images that can be stored at various densities or resolutions in the memory 20. The preferred sensor 16 is a two dimensional sensor that can provide the highest resolution for the captured image and therefor is the sensor that captures the highest number of color pixels. An example of a such a sensor is the megapixel sensor model KAF-1300L available from Eastman Kodak Co. This particular sensor is a 1340×1037 color pixel sensor. When sensors with a larger number of pixels become available, such a sensor should be substituted. Because the captured images are stored in memory 20 at different densities or resolutions, (such as Photo CD quality, 8×10 print quality, 3×5 print quality, facsimile quality or newspaper quality, etc.,) the computer 18, which includes the RAM and ROM necessary for storing the programs needed for controlling the camera, as well as for processing the captured images, performs a conventional image compression process to reduce the number of pixels captured by the sensor 16 to the number and format of the particular density chosen by the user through the interface 22. The compression process can be as simple as appropriate pixel sampling. For example, if the particular storage format required an image of 335×288 pixels and the sensor 16 is the sensor mentioned above, then the compression process can transfer every fourth pixel from the sensor 16 to the memory 20. The compression process or algorithm can of course, perform other sampling type operations, such as weighting pixels in a neighborhood to determine the color value of the pixel that is stored. To improve the storage density and the quality of the stored image the process can perform other types of compression operations, such as storing only new pixels when the pixel color changes by more than a predetermined range and storing a pixel count for pixels that repeat. Other conventional compression processes can of course be used.

Figure 2:
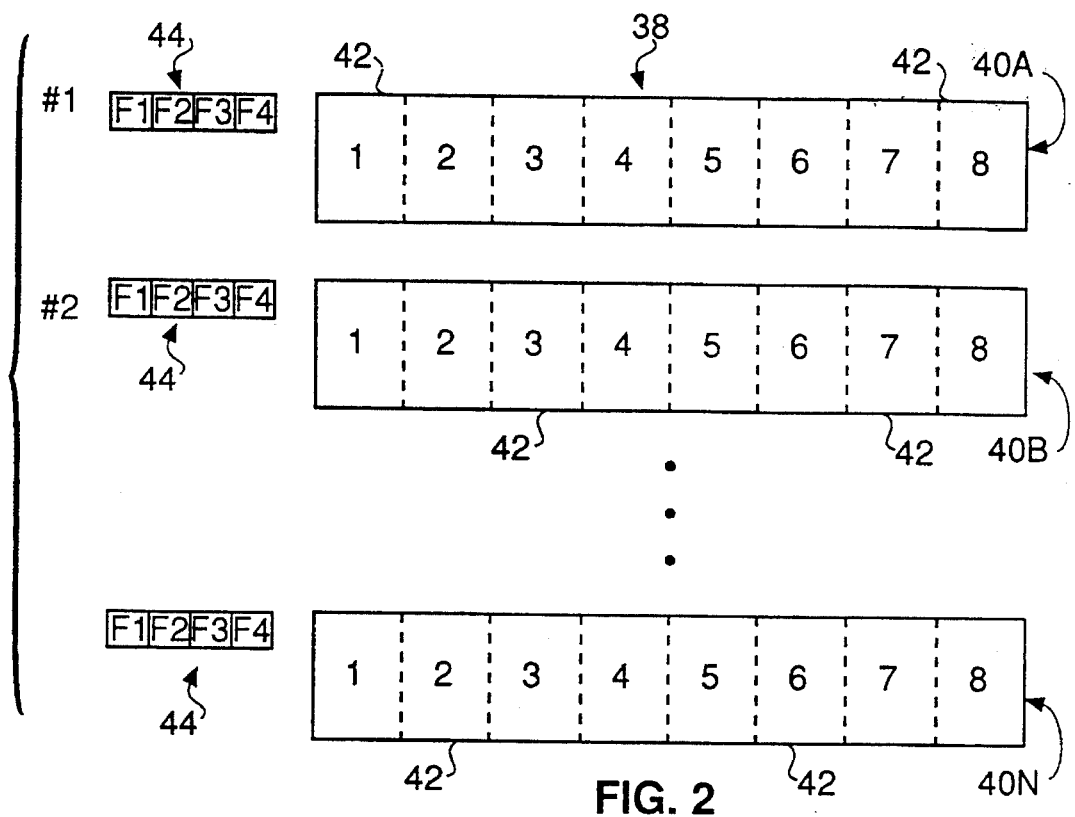
FIG. 2 illustrates the stack memory organization of the present invention.

When taking pictures, the user is allowed to select the density and format of each picture taken on a picture by picture basis. This can be accomplished by a conventional button or toggle with LCD confirmation interface. As a result, the memory 20 must be able to store images at variable densities in a somewhat random order that is associated with the order chosen by the user. Since the user is also allowed to "page-through" the images stored in the memory 20 to designate pictures for transfer to another media, for printing or for deletion, the pictures need to be organized in a way that is simple to access. Because the memory 20 is of limited capacity, or because it is always desirable to maximize the storage capability for a given state of the art memory, the images need to be packed into the memory in a way that is efficient in space utilization without sacrificing ease of access or creating major system overhead. As a result, it is preferable that the images be stored in a stack type structure where each stack location is capable of storing one or more pictures, and importantly generally more than one picture. The preferred stack 38 arrangement is illustrated in FIG. 2. Each stack location 40, is divided into several partitions 42 (i.e. denoted 1–8). Each of the stack locations 40 is preferably designed to store an integral number of the images of the lowest quality or resolution, which (in the example discussed above) is the facsimile or newspaper resolution: due to the fact that each partition 42 is preferably designed to store one of the images with the lowest resolution; and due to the fact that each stack location 40 is also preferably designed to store at least one of the images with the highest resolution. In the example illustrated in FIG. 2, this results in a single Photo CD quality image, the highest resolution image, occupying all eight partitions 42 of a single stack location 40 and a single facsimile image, the lowest resolution image, occupying a single partition 42. As a result of this design, each stack location 40 can store one or more pictures and the number depends on the density of each stored image. For example, assuming that an 8×10 print quality image occupies four partitions 42, this allows each location 40 to store two 8×10 images. Assuming that 3×5 quality prints are to be stored and each location 40 allows four such prints, this results in a 3×5 print image occupying two partitions 42 (see, for example, FIG. 3C in which an 8"×10", 3"×5" and a facsimile are stored in one stack location). Because the camera 8 allows the user to freely select picture density and because the memory must be used efficiently, the present invention also associates in memory 20 with each stack location 42 a set 44 of four flags F1–F4. The flags indicate the full state of each location 42 (that is, the capacity of memory used or more importantly the capacity of memory available in each stack location 40). When flag F1 is set, it indicates that one or two partitions 42 are filled, flag F2 indicates four partitions 42 are used, F3 indicates six partitions 42 are used and F4 indicates eight partitions 42 are used. When the computer 18 is examining any stack location 40 to determine whether the location 40 is capable of storing a picture of the designated density so as to determine whether the memory 20 can store the picture to be taken, the computer 18 examines the flags 44 for each location 40. If no flags are set a Photo CD image can be stored in the stack location 40 being examined. If F1 is set but not flags F2 or F3 or F4, then an 8×10 image can be stored or a 3×5 image as well as another facsimile image. If F1 or F2 are set but not F3 or F4 then a 3×5 quality or facsimile image can be stored. If at least F4 is not set (F1 or F2 or F3 are set) then a facsimile quality image can be stored in the location 40 being examined. To illustrate how this works an example will be discussed with respect to FIGS. 3A–3C.

Figure 3A:
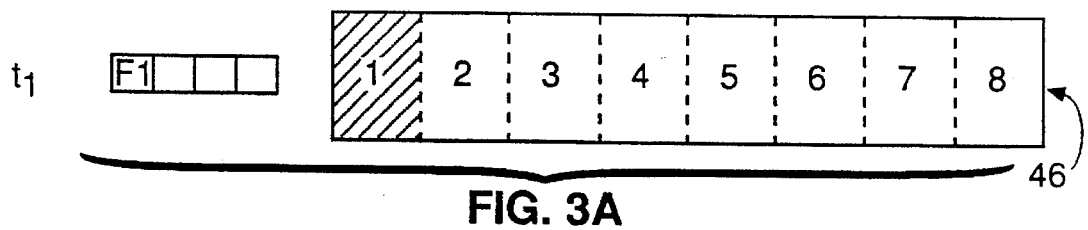
FIGS. 3A–3C illustrate an example of storing images in a particular stack location.
Figure 3B:
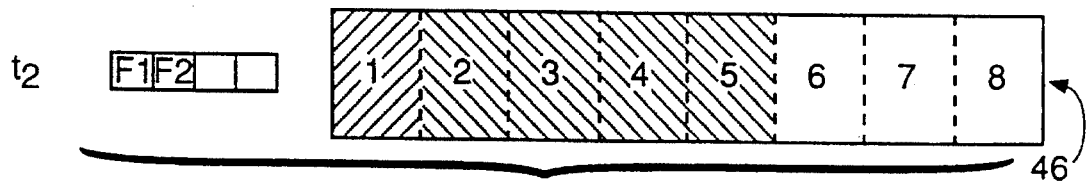
Figure 3C:
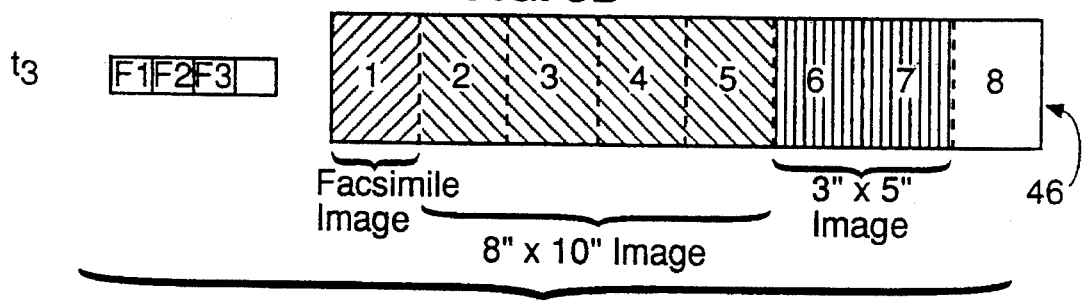

Assume that a particular location 46 in the stack memory 38 is empty and that a facsimile quality image is to be stored (See 40A of FIG. 2 as an example of an empty stack location). Of course because the location 46 is empty and no flags are set any density image can be stored. Since no flags are set the facsimile quality image is stored, at time t=1, in partition 1 of the location 46 and flag F1 is set as illustrated in FIG. 3A. At this point only a CD quality image can now not be stored at this location 46 and if such an image is to be stored the computer must examine other stack locations. When the next image is an 8×10 image, the computer 18 examines the flags and determines that only F1 is set, at time t=2 stores the image in partitions 2–5 and sets F2, as illustrated in figure 3B. At this point the location 46 cannot now store either a CD quality image or a 8×10 quality image. When the next picture is a 3×5 the computer 18 notes that F3 is not set, stores the image in partitions 6 and 7, and sets F3, as illustrated in FIG. 3C. With flags F1–F3 now set the only image that can be stored is the lowest resolution image that occupies a single partition. If an image which needs more than one partition is to be stored, the computer 18 must find space in other stack locations.

Figure 4:
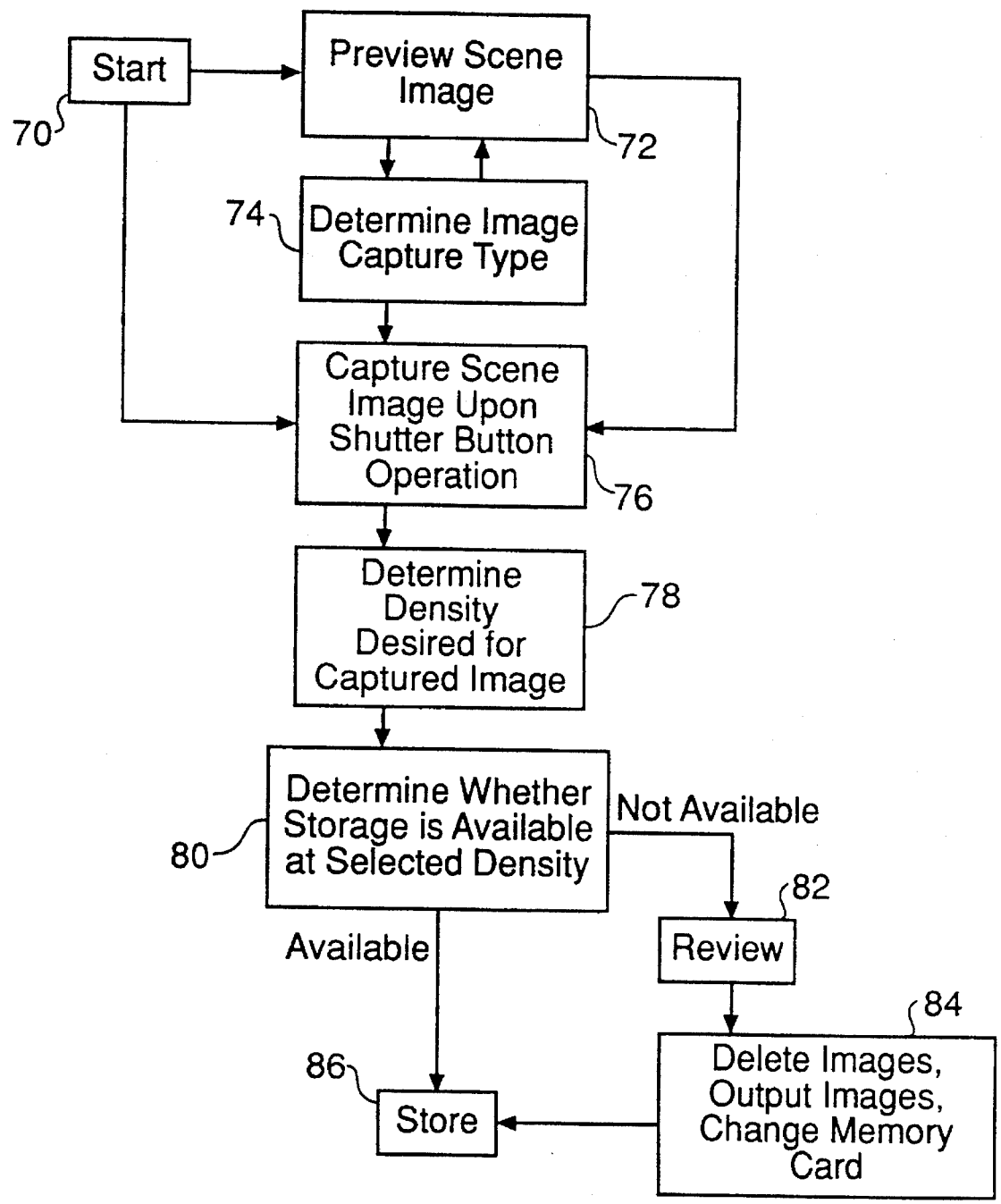
FIG. 4 illustrates the general operation of the camera.

During operation the camera 9 starts 70 from an interrupt or other switch/button/input monitoring mode as illustrated in FIG. 4. The camera can jump to a preview mode of operation 72 where the user is allowed to view the scene in the liquid crystal display 24 before the image is captured. One way of doing this is by using a triple position button which is typically used in cameras with an autofocus capability. Using such a button would allow the top or highest position to be the focus position, the next lowest would be preview and focus, and the third position would start an exposure. In the preview mode the user is allowed to indicate 74 the type of image capture: film or electronic or both. If no selection is made the electronic and film capture type is automatically selected. Once the type is selected and the user activates the shutter the image is captured 76. The user is also allowed to bypass the preview and type selection steps and directly capture a scene. Once the scene image is captured, the user can select or determine 78 the desired density of the image placed in storage. That is, the user selects from, facsimile, LCD, 3"×5", 8"×10" and maximum density images. Once the desired density is determined, the system determines 80 whether sufficient unused storage is available to allow storage of the captured image at the desired density. If not the system allows the user to review 82 images stored in the memory 20. The user can select 84 to delete stored images, output stored images to another media or to change the memory card on which the images are stored. If storage is available or made available the image is stored 86 with the image being compressed according to the selected density. Although a particular sequence has been described, there are numerous variations in the sequence and multiple decision points (such as allowing the user to set density of storage prior to image capture) which can be performed and which variations are considered to be within the capability of those of skill in the art.

The steps of the process of FIG. 4 will be discussed in more detail using the selections of a typical user who wants to capture both chemical and electronic versions of an image, such as a photojournalist who wants to capture a low resolution image for possible inclusion in a newspaper and who also wants a higher resolution version of the image that could be suitable for display in a photographic art gallery. Of course the sequence of events described below can be different or accomplished in a different way than is described.

Figure 5:
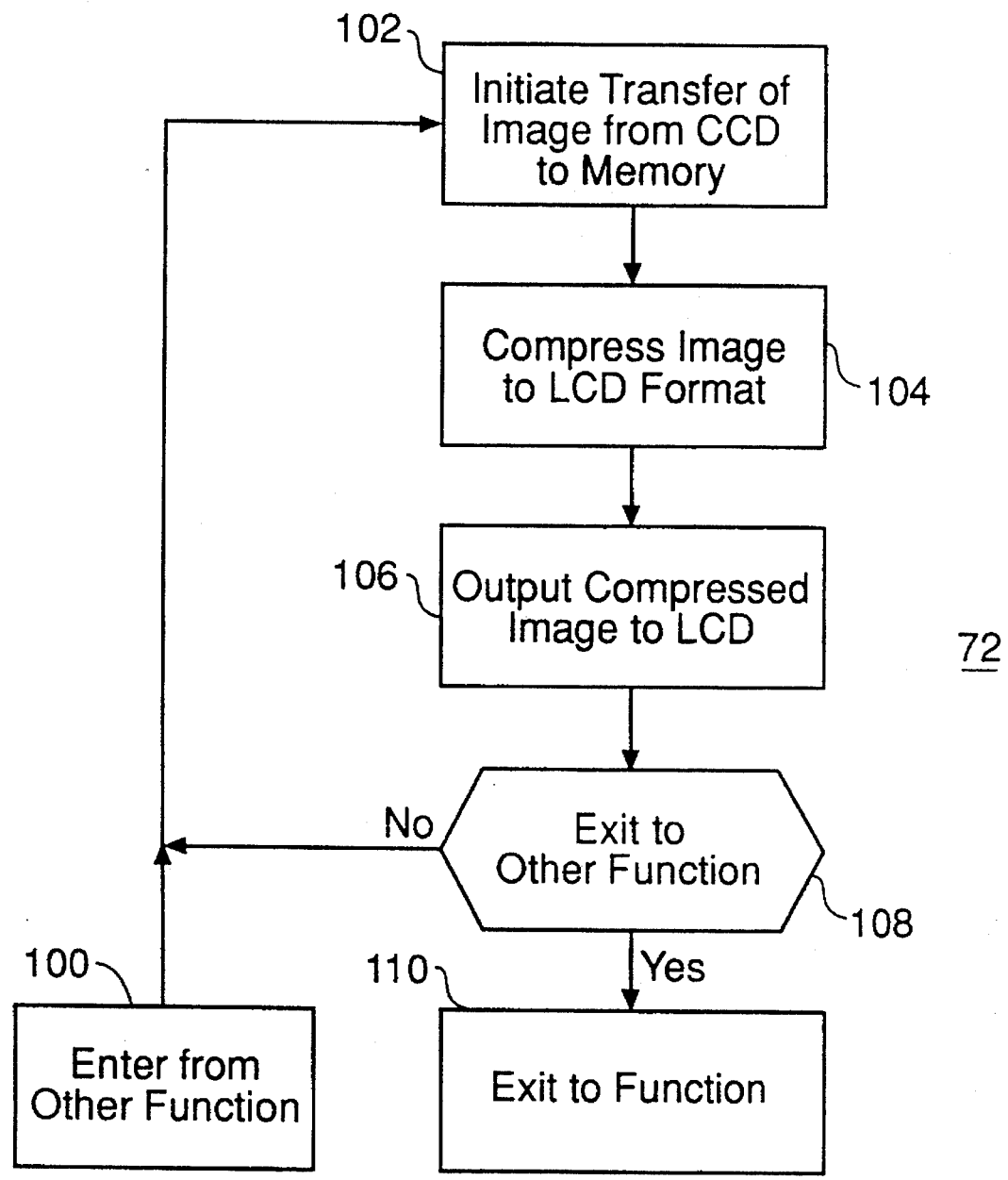

As illustrated in FIG. 5, the preview scene image step 72 includes an entry point 100 that can be entered from other camera functions, such as after selecting the type of image to be captured, or that can be entered upon camera initialization when it is turned on. After entry the process essentially consists of a continuously executed loop that first initiates 102 the transfer of an image from the CCD to a memory which can be either a memory buffer for temporary storage or directly to the storage 20. To allow the image to be viewed the image output by the CCD needs to be compressed 104 into the format and size appropriate for the liquid crystal display (LCD) 24. Once compressed the image is outputted 106 to the LCD and displayed for the user to view. Once the image is outputted the system determines 108 whether to exit to another function. This determination can be made using a number of conventional exit strategies, such as responding to an interrupt caused by, for example, the shutter button being activated, polling the various interface devices to determine if a function is requested or checking flags for various functions. In any event, if no exit is required the system continues looping to display the current image "seen" by the CCD. When an exit is called for the system exits 110 to the appropriate function.

The operation of allowing a user to select the type of image captured illustrated in step 74 of FIG. 4 can be as simple as the user setting a selection switch which is scanned and stored as a flag or could be as sophisticated as displaying a selection menu to the user which allows the user to select the type (electronic and/or chemical) along with other options that could be selected. Once this selection operation is performed control will generally return to the loop of FIG. 5, so that the LCD serves as a viewfinder for the camera 9, although the selection operation could exit to other camera functions, such as exposure selection operations, etc.

Figure 6:
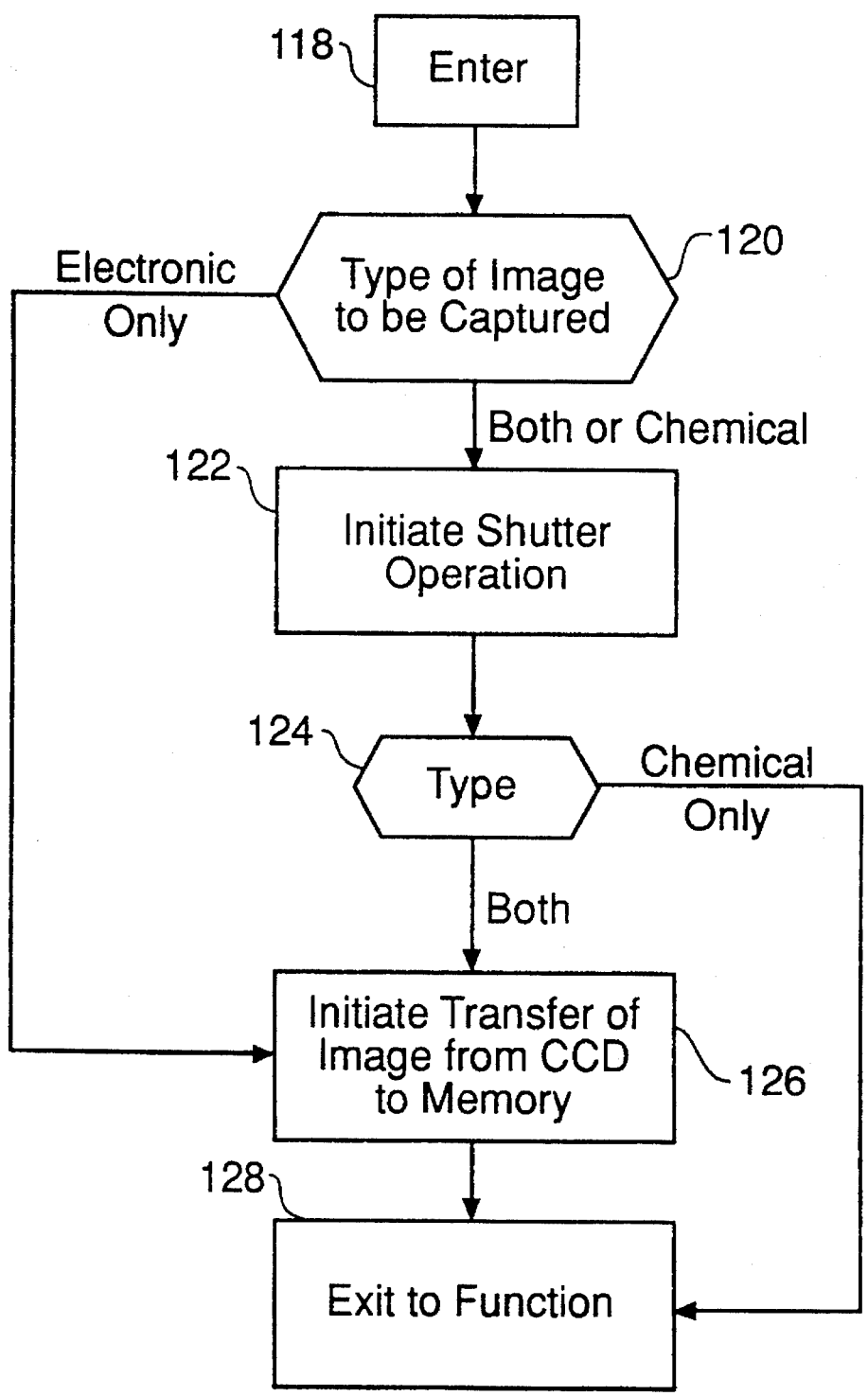

The operation of capturing 76 the scene being viewed by the CCD can also be performed in a number of different ways. As illustrated in FIG. 6, the system first determines 120 the type of image capture that has been selected. In the current example the user has selected both chemical and electronic and the path taken is to the initiate shutter operation 122, such as would occur through the operation of the tristate button. This initiation of the shutter operation 122, in addition to opening and closing the shutter at the appropriate timing, also advances the film after the shutter operation as well as the other conventional film related camera operations associated with a film camera. After the shutter operation is initiated the system again determines 124 the type of image that is to be captured and if chemical only had been chosen the system will branch accordingly. Since both types have been selected in this example, the system proceeds to the step 126 where the transfer of the contents of the CCD, that is, the current image viewed by the CCD, to a temporary memory for later compression, if necessary, and storage in the removable memory 20. Step 126 could occur in parallel with step 122. Once the transfer is complete the system again exits 128 to an appropriate function which in this example is the function which allows the user to determine the density desired for the captured image.

Like the step 74 of determining image capture type this step 78 of determining the desired density for the captured image can be a simple switch selection or a menu based LCD display interaction that allows the user to interactively select from among densities, such as facsimile, 3"×5", 8"×10", etc. In this example, the user selects a low resolution version of storage that is suitable for a newspaper, such as facsimile resolution.

Once the particular density is selected the system determines 80 (see FIG. 4) whether the memory 20 includes sufficient space for the image at the desired density. This determination operation is illustrated in more detail in FIG. 7. The first step 140 is to set the stack location pointer to the beginning of the stack. The system then compares 142 the stack location flags F1–F4 to the density desired with the comparison essentially comparing the number of partitions needed to the number that are empty or available. When the particular location has storage space available, which in this example requires one partition, the system exits through the "Available" branch exit to the storage operation 86. If the stack location will not store the captured image at the desired density the system advances 144 the stack location pointer by one stack position. After which the system determines 146 whether the last stack location has been examined. If so the system has examined all locations and storage space is not available at the desired density, and the system exits via the "Not Available" branch and proceeds to allow the user to pursue several options that can result in space becoming available.

If sufficient space is not available the system allows the user to sequence through the stored images to determine whether any can be deleted, should be outputted to an external storage device or whether the memory card should be changed (See 82 and 84 of FIG. 4). To do this the stack location pointer is used to point to a particular stack location. To help determine whether each partition within each stack location contains picture data several different types of indicators can be used. For example, in one approach at the start of each partition a special data pattern can be provided that indicates that the partition is empty and which data is overwritten when an actual picture is stored in the partition. Other approaches are of course possible. The system can also store an indicator at the beginning of the picture indicating the start of the picture data as well as the size of the data. If this approach is taken after the stack location pointer is updated the partitions are examined for picture data and start data. The system then displays each of the pictures in the stack location in their order within the stack under user control. The user is of course allowed to exit this review to the next function 84 at any time. When all of the images of the stack location have been reviewed the system, updates the pointer to the next location and continues the cycle. If the end of the stack is reached the stack location is reset and the user is allowed to cycle through the images again.

Once the user has performed the review 82 the user can delete stored images, output stored images or change the memory card 84. Like some of the previous steps this can be a menu based operation in which the user selects a particular operation say "keep", "delete" or "output" and then enters a review cycle much like that previously discussed in which the user can designate images for deletion or outputting. At the end of the stack when the pictures have been designated for deletion, transfer, etc. the system can automatically perform the designated operation. As an alternative, the user could be given the various operation options during the step 82 for each picture and the operation could be performed immediately. Other approaches to performing step 84 can of course be taken.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the invention has been described with respect to a stack with a flags/stack type data structure. Other data structures are possible, such as a pointer directed list.

Reference Number List

F1,F2,F3,F4 Flags
$t_1,t_2,t_3$ Time points
1–8,42 Partitions
9 System
10 Lens
12 Beam splitter
14 Film negative
16 CCD sensor
18 Computer
20 Memory
22 User interface
24 Liquid crystal display
25 Output interface
26 Adjustable lens
28 Mirror
38 Stack memory
40A,40B,40N,46 Stack location
44 Flag location
70–146 Process steps

What is claimed is:

1. A camera for capturing images of different quality levels, said camera comprising:

a lens section providing a common source for generating a source image;

a beam splitter for splitting the source image into a first image and a second image; and capture means for providing two quality levels of film capture and a further level of electronic capture for the source image from the common source, said capture means including:

a film optically coupled to said beam splitter so as to capture only the first image;

an electronic sensor optically coupled to said beam splitter for capturing the second image;

a light routing mechanism for optically decoupling the film from the beam splitter and routing the source image to said film and capturing a third image while bypassing said beam splitter; and a user interface for selecting one of two levels of image storage quality for film capture, said two levels including a first level for obtaining a lower quality of film capture from the first image when the film is optically coupled to said beam splitter and a second level for obtaining an improved quality o film capture from the third image by optimum utilization of the source image when the light routing mechanism optically decouples the film from said beam splitter.

2. A camera as recited in claim 1, wherein said routing mechanism comprises an adjustable lens and a mirror coupled between the common source and the film for bypassing the splitter.

3. A camera as recited in claim 1, wherein said routing mechanism comprises means for pivoting said splitter out o a light path between the common source and said film.

4. A method for capturing images of different quality levels, said method comprising the steps of:

focusing a source image from a common source;

optically splitting the source image into a first image and a second image by means of a beam splitter;

optically coupling a film to said first image so as to capture only the first image;

optically coupling an electronic sensor to said second image for capturing the second image;

optically decoupling the film from the beams splitter and routing the source image to said film and capturing a third image while bypassing said optical splitting step; and selecting one of two levels of image storage quality of film capture for the source image from the common source, said two levels including a first level for obtaining a lower quality of film capture from the first image when the film is optically coupled to the beam splitter and a second level for obtaining an improved quality of film capture from the third image by optimum utilization of the source image when the film is optically decoupled from the beam splitter and the source image is routed to the film.

* * * * *